United States Patent [19]

May

[11] 3,777,245

[45] Dec. 4, 1973

[54] CLOSED LOOP STEPPING MOTOR CONTROL FOR A TAPE READER

[75] Inventor: Joe C. May, Cheshire, Conn.

[73] Assignee: The Superior Electric Company, Bristol, Conn.

[22] Filed: June 23, 1972

[21] Appl. No.: 265,658

[52] U.S. Cl. .................. 318/685, 318/603, 318/696

[51] Int. Cl. .......................................... G05b 19/40

[58] Field of Search .................... 318/603, 685, 696

[56] References Cited

UNITED STATES PATENTS

| | | | |
|---|---|---|---|
| 3,707,663 | 12/1972 | Bishop | 318/685 |
| 3,353,161 | 11/1967 | Toscano | 318/603 X |
| 3,356,918 | 12/1967 | Williams | 318/603 |
| 3,374,410 | 3/1968 | Cronquist et al. | 318/685 |

*Primary Examiner*—T. E. Lynch
*Attorney*—Arthur A. Johnson et al.

[57] ABSTRACT

A tape reader having a reading station past which tape having transverse rows of holes is moved by a drive system that includes a stepping motor with the system, after a stop command, inhibiting further reading while continuing to move the tape a plurality of rows and then reversing the tape movement for only the extent that it continued moving after the stop command thereby enabling the system to move the tape at a faster rate than if the system was required to have the ability to stop immediately at any one of the rows.

10 Claims, 1 Drawing Figure

PATENTED DEC 4 1973
3,777,245
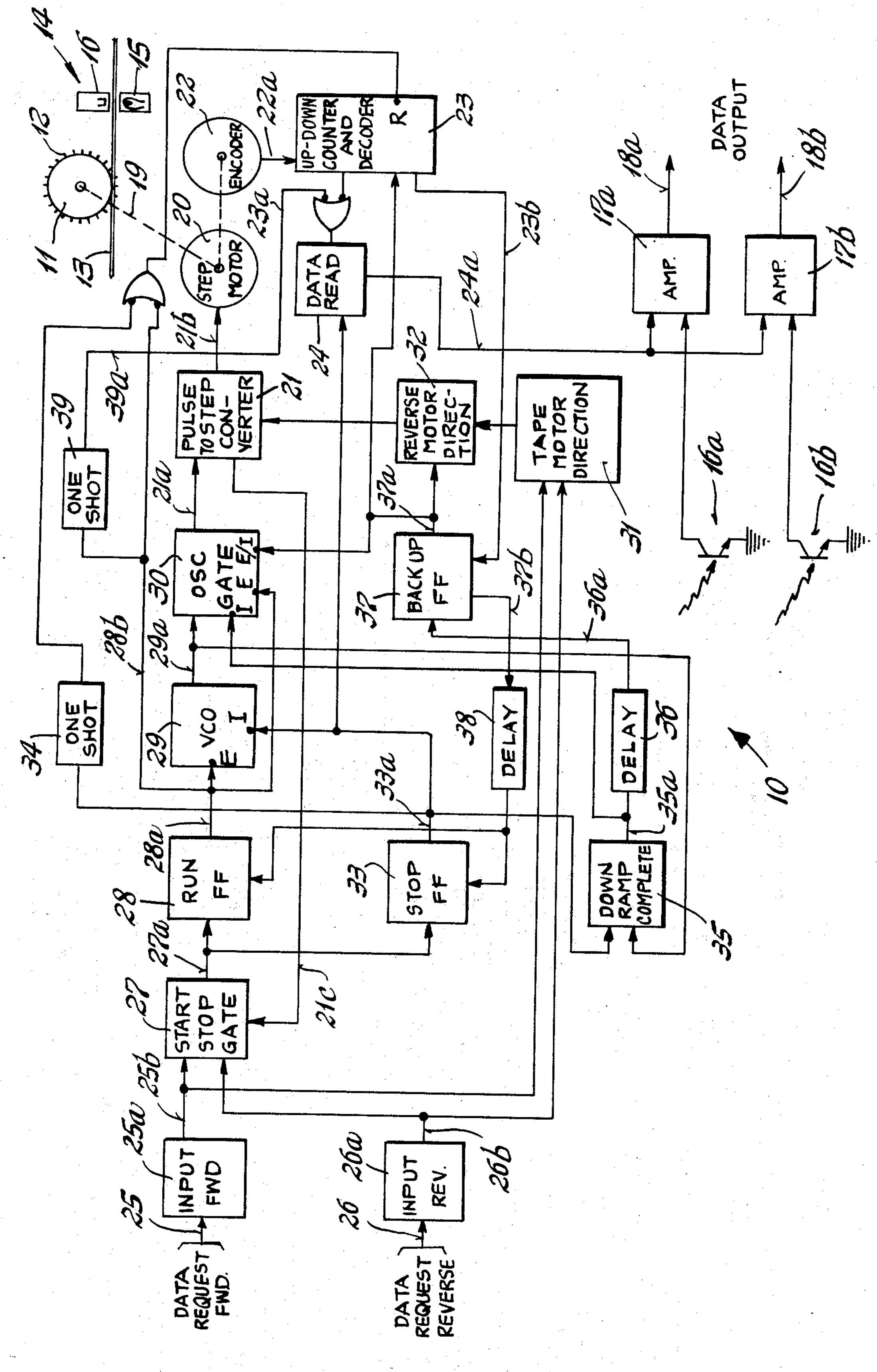

CLOSED LOOP STEPPING MOTOR CONTROL FOR A TAPE READER

In of the Pat. No. 3,638,028 assigned to the assignee ofthe present invention, there is disclosed a tape reader for providing electrical representation of punched holes coded in transverse rows on a tape. The tape is moved past a reading station by a sprocket that is directly driven by a stepping motor and which engages the tape feed holes. The motor is capable of stopping at any one of the rows upon command without advancing beyond the row where the stop command occurred.

Though such a reader has been found extremely satisfactory, requirements that a reader process or read tape at many times such a reader's normal rate has reduced the assurance that the motor can stop the tape upon command at any one of the rows without the loss of reading of a row and damage to the tape especially when the tape is processed from reel to reel.

It is accordingly an object of the present invention to provide a tape reader that uses a stepping motor which is capable of operating at many times the speed of the above-noted reader while retaining, with assurance, the ability to stop reading at any one of the rows without the loss of the reading of a row.

Another object of the present invention is to provide a tape reader which upon receipt of a stop reading command continues to move the tape while preventing further reading, decelerates during the continued movement and then reverses the tape movement for at least the extent of the unread movement that occurred after the command to stop thereby preventing the non-reading of a row.

A further object of thepresent invention is to achieve the above objects with a the present reader which is reliable and durable in use, capable of being used with either fan fold or reel tape storage and relatively economical to manufacture for the results obtained.

In the specific embodiment of the invention herein disclosed the tape to be read has a plurality of transverse rows with each row having a plurality of locations at which a hole may be punched. The tape is moved through a feeding station which senses the presence or absence of a hole in each position in a row and provides a representative electrical signal thereof.

In accordance with the present invention, the tape is moved by a motor which drives a sprocket that engages the tape so that upon receipt of a command signal to "read" the tape, the motor continually moves the tape and the reading station provides an electrical representation of each row until a stop reading command is received. This stop command immediately prevents further reading of the rows, i.e., electrical representations thereof. However, the motor continues to move the tape past the reading station in the same direction at a decelerating rate until it finally stops. After a short delay, the motor is then reversed (while still inhibiting the reading station from reading) to move the tape in the other direction for the rows that were not read and then stops movement with the first "unread" row at the reading station. The tape reader is then ready to accept the next command signal to read the next portion of the tape.

To assure that the reverse movement of the tape will be exactly equal to the extent of movement of the unread portion of the tape that occurs when the motor is decelerated to a stop, the system includes an up-down counter that initially counts the extent of the tape movement as it is decelerated and then subtracts the movement of the tape in a reverse direction. By selecting a count of the counter which equals the count produced between each row, the reader may subtract counts until the first non-read row is positioned at the reading station, as herein disclosed or count to zero to have the last read row positioned at the reading station.

Other features and advantages will hereinafter appear.

In the drawing:

The sole FIGURE is a block and diagrammatic representation of the reader of the present invention.

Referring to the drawing, the reader of the present invention is generally indicated by the reference numeral 10 and includes a sprocket 11 having projections 12 that engage feed holes (not shown) in a tape 13. The sprocket upon rotation moves the tape longitudinally past a reading station 14 which has photoelectric elements such as a lamp 15 and a photo transistor 16 for sensing the absence or presence of a punched hole at each one of the locations in a row.

Two photo transistors are schematically shown and indicated by the reference characters 16*a* and 16*b* with the output of the photo transistor 16*a* being amplified by an amplifier 17*a* to appear on a lead 18*a* with the output being a voltage logic level representing whether the photo transistor 16*a* has sensed a hole or absence of a hole in a row at its location. Similarly the photo transistor 16*b* has an amplifier 17*b* and an output 18*b* on which its electrical representations appear. It will be understood that there are as many photo transistors and associated amplifiers as there are locations in a row which in one usual instance is eight plus a feed hole reading unit, if reading of the feed hole is desired.

The sprocket 11 is connected as indicated by dotted line 19, to the shaft of a stepping motor 20. The motor receives its energization from a pulse to step converter 21 which translates each pulse received on a lead 21*a* into a change of energization on a lead 21*b* to the stepping motor with the stepping motor advancing one step for each change of energization. Each step of the motor is identical in length so that each change of energization produced by a pulse on the lead 21*a* will produce an equal length movement of the sprocket 11 and hence an equal length movement of the tape 13.

While it is possible to sense the extent of movement of the tape by sensing the feed hole in each row or by the pulses on the lead 21*a*, in the specific embodiment of the invention herein disclosed, there is provided an encoder 22 which is secured to the stepping motor shaft and produces a signal on a lead 22*a* for each incremental movement of the motor 20. Preferably while there may be one signal for each step, it has been found that a more accurate and assured reading may be achieved if the encoder provides more than one signal per step. For example, the number of steps per revolution of the motor and sprocket may be dimensioned such that four steps of the motor (out of 200 per revolution) are required to move the tape the distance between a row while the encoder provides four signals for each step or 16 signals between rows.

The encoder signals on the lead 22*a* are counted by an up-down counter and decoder 23 which produces on a lead 23*a* a signal or voltage level for every 16th encoder signal counted. This signal is introduced to a data read block 24 which during normal operation passes a signal on a lead 24*a* to the amplifiers 17*a* and 17*b* and such a signal enables each amplifier to pass its signal from its associated photo transistor to its respective output 18*a* and 18*b*. An output can thus appear only concurrently with the signal appearing on the lead 24*a*.

In the present specific embodiment, with four steps required between rows to have 16 signals on the lead 22*a* between rows, the counter 23 thus provides a signal on the lead 23*a* only for every 16th count of the counter 23 which if passed by the data of read block 24 causes the amplifier to only be able to amplify a signal to its output for 1/16 of the time required for movement between rows with the reading time being made to occur when a row is at the reading station. In the absence of a signal from the data read block 24 signals are prevented from appearing at the output leads 18*a*, 18*b*, etc.

The reader accepts a read command in the forward direction on a lead 25 or in a reverse direction on a lead 26 with a block 25*a* or a block 26*a* producing on their respective output leads 25*b* and 26*b*, a voltage level that is compatible with a start stop gate 27. The input command may be a pulse or a voltage level with the blocks 25*a* and 26*a* maintaining the lever or if only a short duration command pulse somewhat lengthening it but not to an extent greater than the time to move the tape one row.

The gate 27 with a read command voltage level on either lead 25*b* or 26*b* produces a voltage level on a lead 27*a* to the set terminal of a run flip-flop block 28. The voltage level on the lead 27*a* is made to change (from either a read to a stop or a stop to a read) only at the time when the motor is making the step that positions a row at the reading station with such synchronization being effected by a lead 21*c* that has a voltage level for only every fourth pulse to the pulse to step converter 21. The start stop gate 27 will either maintain its voltage level on the lead 27*a* if it has a read command or will change to a zero voltage level. The run flip-flop block 28 is basically a flip-flop that is set by the first positive voltage level on lead 27*a* to maintain a run state to energize over a lead 28*a* a voltage controlled oscillator 29.

The oscillator 29 is of the ramping type in that it has a minimum oscillating rate but a voltage level appearing on the lead 29*a* assures it to accelerate over a plurality of pulses to its set maximum level while a voltage on its I terminal causes it to decrease or decelerate to its minimum rate again over a plurality of pulses. One example of the rates may be a minimum rate of 300 pulses per second and a maximum rate of 2000 steps per second. An oscillator gate 30 is positioned between the oscillator 29 and the lead 21*a* and passes the oscillator pulses to produce a step of the motor 20 for each pulse with the passing occurring by reason of lead 28*a* from the run flip-flop 28 being connected to its enabled (E) terminal. If the gate 30 does not pass pulses by a voltage on its inhibit (I) terminal, the motor will be stationary as it will not receive any changes of energization.

Both leads 25*b* and 26*b* are also connected to a tape motor direction block 31 which senses on which of these two leads a command to read has appeared and passes this information through a reverse motor direction block 32 to the pulse to step converter 21 to assure that the motor 20 will move in the commanded direction.

Accordingly, with a read command on the terminal 25, the run flip-flop 28 is set to its run condition which energizes the voltage control oscillator 29 and causes it to produce pulses at an increasing rate with the pulses being passed through the oscillator gate 30 to effect an increasing or accelerating movement of the motor 20. The motor movement is sensed by the encoder 22 and for the amount of movement required by the motor to move the tape from one row to the next produces on the lead 23a a signal which is passed by the data reading block 24 through the first and second amplifiers 17*a* and 17*b* to effect an electrical representation of the punched information in each row.

Upon the read command being eliminated from the lead 25 to produce a stop command, the gate 27 will change the voltage level on the lead 27*a* to a 0 state when the motor is energized to take the step that positions a row at the reading station. This change does not alter the run flip-flop 28 but changes the state of a stop flip-flop 33. Its change is reflected in its output lead 33*a* to provide an inhibiting voltage to the data read block 24 to prevent further read out through the amplifiers 17*a* and 17*b* irrespective of the continued movement of the motor by preventing signals on the output leads. In addition, the lead 33*a* inhibits the voltage controlled oscillator 29 to cause it to assume its decelerating rate condition to move the motor at a decelerating rate. The change of state of the stop flip-flop 33 is also used to reset the counter 23 to a count of zero by means of a rapidly acting one shot 34 connected to the reset terminal (R) of the counter 23. Thus as the motor is decelerating after the stop command, the counter 23 has been set to zero and counts the signals from the encoder 22 the electrical representations of the rows that pass through the reading station are prevented from appearing.

When the pulses from the voltage controlled oscillator 29 have reached their minimum rate of about 300 steps per second, a down ramp complete block 35 senses this rate and when it occurs simultaneously with information from the set condition of the stop flip-flop 33, it immediately inhibits the oscillator gate 30 to stop the motor. Also it produces a signal after a time interval of perhaps 10 milliseconds caused by a delay 36, to a back up block 37 on a lead 36*a*. The back up block, on a lead 37*a* to the E/I terminal of the gate 30, enables the oscillator gate 30 to pass pulses (even with an inhibit signal from the lead 28*a*) and also causes the motor direction control 32 to change to its signal to the converter 21 from that which it was initially directed by the tape direction block 31 with this direction signal causing the converter 21 to reverse the sequence of changes of energization. The lead 37*a* is also connected to the counter 23 and causes the counter to subtract from its count any signals received on the lead 22*a*. Once the gate 30 is opened by the lead 37*a*, pulses at the minimum rate from the voltage controlled oscillator 29 are changed to steps of the motor in the reverse direction and the motor will reversely step to move the tape in the other direction through the reading station with the movement being counted by the counter 23 as it reduces its count from the count which it attained after a stop command had appeared.

The motor will continue tape movement until a signal appears on a lead 23*b* of the counter 23 that indicates that the counter has its count reduced to a count which is equivalent of the number of signals required to move the tape one row. The lead 23*b* signal causes the back up block 37 to change to its original state, eliminating the voltage level on the lead 37*a* which makes lead 35*a* again inhibit the oscillator gate 30 to prevent further motor movement, restores reverse motor direction block 32, eliminates the subtract command from the counter 22 and passes a signal indicating the restored state of block 37 on a lead 37*b* to a delay 38. The delay 38, is again perhaps 10 milliseconds, and after such a time, it passes a reset signal to the stop flip-flop 33 to reset it and also the the run flip-flop 28 to place it in a condition to be set.

The motor is now stopped with the first row, after the row on which the stop command appeared, positioned at the reading station. It will be understood that if desired the last row read may be positioned thereat instead by using the zero count of the counter to produce a signal on the lead 23*b* to reset the back up block 37.

The delay 36 is utilized to assure that the motor 20 has come to essentially a complete rest with only inconsequential oscillation and hence is assured of responding by moving in the proper direction to a change of energization at the minimum oscillator rate. The purpose of the delay 38 is similar and it prevents a new read command from effecting motor energization until its time has expired.

With the resetting of the run flip-flop 28 and until the next read command has appeared, the count of the-counter 23 is set to and maintained at a zero count by a lead 28*b* connected to the counter reset terminal. Thus, even if the sprocket is manually moved, the counter count will be zero when the next read command appears.

With the next read command, initially the row at the reading station is read by the setting of the run flip-flop 28 passing a singal to a one-shot 39 which produces through a lead 39*a* an enabling signal to the data read block 24 which in turn passes an enabling signal on the lead 24*a* to the amplifiers 17*a* and 17*b*. The one-shot 39 is quite rapid and effects reading before the motor has produced a movement which would move the first unread row from the reading station.

The accelerating and the decelerating rates may be adjusted over quite a wide range with one example of acceleration of 300 steps to 2000 steps/sec. being accomplished in 80 milliseconds while deceleration is substantially faster and may be 10 or so milliseconds from 2000 to 300 steps/sec. In any event the decelerating rate is set so that at least four pulses are produced even if the read command is only to read one row in order to assure that the tape has moved the first unread row at least to the reading station and the counter 23 will have a count of four.

The maximum count of the counter may be on the order of 256 so that up to sixteen unread rows may pass through the reading station providing a relatively large range of decelerating rates. Normally with a maximum reading of 500 rows per second (the oscillator producing pulses at a 2000 Hz rate), only around four or five unread rows occur before reversal of the motor 20. In view of the adding and subtracting of encoder signals, the relative location of a row and the reading station is immaterial when the motor is reversed.

With respect to a command to read one row which is a short duration pulse on the lead 25 (or 26), the motor speed stays at the base rate which enables the motor to be stopped at the next row without reversal.

It will accordingly be understood that there has been disclosed a tape reader which is capable of producing electrical representations of punched tape at a rapid rate but yet retain with complete assurance, the ability to stop a command at any one of the rows. This is achieved by continuing to move the tape after a stop command but at a decelerating rate to a stop and the reversing the movement of thetape at a relatively slow rate until the portion moved after the stop command is positioned to be read. Even though the tape is moved after the stop command, reading of rows is prevented. Thus by being able to slow the tape movement to a stop slowly as compared to attempting to stop immediately, and by stopping immediately only when moving the tape slowly in a reverse direction, the rate at which the reader can normally read the tape is substantially increased.

Variations and modifications may be made within the scope of the claims and portions of the improvements may be used without others.

I claim:

1. A tape reader comprising a reading station at which means are provided for producing electrical representation of information longitudinally disposed on tape, and means for moving the tape longitudinally past the station, said moving means including means for initiating and continuing movement of the tape upon a start command, means for receiving a stop command and preventing further representations from appearing while the tape is continued to be moved past the reading station after the stop command and means for longitudinally moving the tape in the reverse direction to locate the start of the tape whose electrical representations were prevented from appearing in position at the reading station to produce electrical representation upon receipt of the next start command.

2. The invention as defined in claim 1 in which there are means for measuring the extent of continued movement of the tape after the receipt of the stop command and means for measuring the extent of movement of the tape in the reverse direction.

3. The invention as defined in claim 2 in which the measuring means includes means for providing a digital signal for each longitudinal increment of tape moved, counter means for adding the increments of tape continued movement and subtracting the increments of tape reversal movement and means for stopping tape movement upon a selected count of the counter.

4. The invention as defined in claim 3 in which the tape is provided with equally spaced transverse rows of the holes, in which there is at least one increment between rows and in which the selected count of the counter means for operating the stopping means is equal to the number of increments between rows, whereby the first row that is prevented from having its electrical representation appear is positioned at the reading station when the tape is completely stopped.

5. The invention as defined in claim 4 in which there are means for immediately causing the electrical representation of the row at the reading station to appear upon receipt of the next start command.

6. The invention as defined in claim 1 in which the moving means includes a sprocket connected to a reversible electric motor, in which there are means for accelerating the motor over a plurality of representations upon receipt of a start command and means for decelerating the motor over a plurality of representations upon receipt of a stop command.

7. The invention as defined in claim 6 in which the tape moving means includes means for stopping the motor when it is decelerated to a selected speed and means for maintaining the motor stopped for a selected interval before initiating reverse movement.

8. The invention as defined in claim 7 in which the reverse movement is at an essentially constant speed that approximates the speed at which the motor is decelerated to a stop state prior to its reversal.

9. The invention as defined in claim 1 in which there are means for delaying the initiating of movement upon receipt of a next start command for a selected time after the terminating of prior tape movement.

10. The invention as defined in claim 1 in which the tape is provided with equally spaced transverse rows of holes, in which the motor is a stepping motor providing a step for each change of energization thereto and in which there are a plurality of steps required to move from one row of holes at the reading station to the next row.

* * * * *